United States Patent
Spiegelman et al.

(10) Patent No.: US 6,350,300 B1
(45) Date of Patent: Feb. 26, 2002

(54) GAS PURIFICATION APPARATUS

(75) Inventors: Jeffrey J. Spiegelman, La Jolla; Peter K. Shogren, San Diego, both of CA (US)

(73) Assignee: Aeronex, Inc., San Diego, CA (US)

( * ) Notice: Subject to any disclaimer, the term of this patent is extended or adjusted under 35 U.S.C. 154(b) by 0 days.

(21) Appl. No.: 09/771,335

(22) Filed: Jan. 26, 2001

(51) Int. Cl.[7] ............................................... B01D 53/04
(52) U.S. Cl. ........................... 96/135; 96/147; 55/418; 55/512
(58) Field of Search ........................ 96/108, 135, 147, 96/152; 55/418, 512–519; 210/446, 435

(56) References Cited

U.S. PATENT DOCUMENTS

| | | | |
|---|---|---|---|
| 3,322,411 A | * | 5/1967 | Moore |
| 3,598,540 A | * | 8/1971 | Chase |
| 4,781,900 A | | 11/1988 | Tom et al. |
| 5,716,588 A | | 2/1998 | Vergani |
| 5,762,692 A | * | 6/1998 | Dumas et al. ................. 96/141 |
| 5,779,773 A | * | 7/1998 | Cam et al. ..................... 96/152 |

FOREIGN PATENT DOCUMENTS

| | | | |
|---|---|---|---|
| FR | 621932 | * | 5/1927 |
| JP | 04124001 | | 4/1992 |
| WO | WO 99/22848 | | 5/1999 |

OTHER PUBLICATIONS

Z–Bloc Modular Gas Systems Brochure, pp. 7–8, 1998.

* cited by examiner

Primary Examiner—David A. Simmons
Assistant Examiner—Frank M. Lawrence
(74) Attorney, Agent, or Firm—Brown, Martin, Haller & McClain LLP

(57) ABSTRACT

A gas purification apparatus has a housing with an inlet end having an inlet port for gas supply to an interior chamber, and an opposite, outlet end having an outlet port for exit of purified gas from the chamber. The housing is of generally cylindrical shape with a central axis, and the inlet and outlet ports are offset from the central axis towards a lower portion of the housing. A purification medium fills at least the majority of the chamber. The internal wall of the chamber is cylindrical along part of the length of the housing extending from the outlet end, and has a rounded or part-spherical inlet portion extending from the inlet port to the cylindrical part of the internal wall.

22 Claims, 1 Drawing Sheet

GAS PURIFICATION APPARATUS

BACKGROUND OF THE INVENTION

The present invention relates to a gas purifier apparatus for removing contaminants or impurities from gas streams.

Gas purification to high levels of purity is important in industries such as LED, blue laser, and semiconductor manufacture and the like. Known gas purifiers typically comprise a cylindrical outer housing or canister having an inlet port at one end for receiving a gas to be purified, and an outlet port at the opposite end for exit of purified gas from the housing. The inlet and outlet ports are located co-axially on the central axis of the housing. The housing is filled with a suitable gas purification medium and filter through which the gas passes while traveling in a generally axial direction from the inlet port to the outlet port. The purification medium is of any suitable material or materials for removing the contaminants by absorption or the like.

Retrofit of filters on gas panels with such purifiers to improve gas purity has not been possible in the past due to space limitations on the panel. Panel mounting of gas delivery and purification components is desirable in view of the large space savings and resultant ease of maintenance. A conventional purifier cannot be mounted on such panels in view of the small space or clearance permitted between the inlet and outlet ports and the panel. This means that the housing would have to have a relatively small diameter, and thus a small capacity for purifier medium, so that it could be horizontally mounted on the panel while permitting suitable interconnections to be made between the panel and inlet and outlet ports. Small diameter purifiers are impractical in view of their low flow rates. Small diameter purifiers would also lead to very high pressure drops and very short life times, forcing users to keep toxic and hazardous gases at higher pressures to ensure a sufficient flow rate. The result is more dangerous operating conditions.

A purifier comprising a cylindrical housing with flat end walls and an inlet and outlet port offset from the central axis has been proposed in the past in order to allow sufficient volume capacity for the purifier medium, while permitting it to be fitted in an existing panel mounting arrangement. However, this results in significant "dead space" at the inlet end of the housing where the purifier medium will not be utilized since the gas will not flow through it. Dead space is the volume within a purifier which is not swept by gas flow under normal operating conditions. Regions at the inlet end of the purifier above the offset inlet will typically form such a dead space. Additionally, when the purifier medium needs to be regenerated to remove the absorbed impurities at periodic intervals, it is difficult or impossible to regenerate regions of the chamber adjacent the flat inlet end above the inlet port, which essentially lie in the dead space.

SUMMARY OF THE INVENTION

It is an object of the present invention to provide a new and improved gas purification apparatus which can be mounted on a panel to replace existing filters while retaining a sufficient volume of purifier medium for effective removal of impurities from a gas without modifying the panel.

According to the present invention, a gas purification apparatus is provided, which comprises a housing having an internal purification chamber, an inlet end having an inlet port for gas supply to the chamber, and an opposite, outlet end having an outlet port for exit of purified gas from the chamber, the housing being of generally cylindrical shape and having a central axis, an upper portion above the axis, and a lower portion below the axis, and the inlet and outlet ports are offset from the central axis and located in the lower portion of the housing. A suitable purification medium fills at least a major portion of the chamber. The chamber has an internal wall which is cylindrical along part of the length of the housing extending from the outlet end, and which has a rounded or swept, tapering portion extending from the inlet end to the cylindrical part of the internal wall. In an exemplary embodiment, the tapering portion is formed by a part-spherical, spheroidal, or ellipsoidal counter-bore at the inlet end of the chamber. The rounded counter-bore may be formed on a lathe.

The gas purification apparatus in an exemplary embodiment is designed to purify a gas to purity levels of at least 10 ppm, and may provide purity levels better than 1 ppb. The housing material may be stainless steel, nickel or hastalloy. The rounded or swept portion extends from the inlet port up to the cylindrical portion of the bore, and cuts off the corner which would otherwise be present if the cylindrical part extended up to a flat end wall at the inlet, as in the prior art. This ensures that gas entering the chamber at the offset inlet port will flow through the entire volume of purification medium, avoiding any dead space. The offset inlet and outlet port allow the purifier to maintain a large diameter, permitting a larger outlet filter and avoiding the need for dangerously high gas pressures, and permitting the housing to be readily mounted in the limited clearance available on a panel in a gas panel application. The purification medium may be any suitable particulate or molecular purification material, or combination thereof, depending on the nature of the impurities to be removed from the gas.

The swept or rounded inlet portion of the chamber ensures that all portions of the purification medium are used for removal of impurities from the gas, avoiding dead spaces and resultant inefficiency and reduced purification medium lifetime. The purification apparatus can be used with all gases and is regenerable, reducing the cost and problems of hazardous waste disposal. The purification apparatus can be used to replace all existing panel mount filters and purifiers, without any modification of the gas panel. In many cases, purifiers are preferable to filters because they remove molecular contaminants which are impossible for filters to catch. This results in higher purity levels which are advantageous in many manufacturing industries. This invention makes upgrading an existing gas panel from filters to purifiers both easy and inexpensive, since the purifiers can be readily fitted into tight spaces without modification of the existing panel or hardware.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
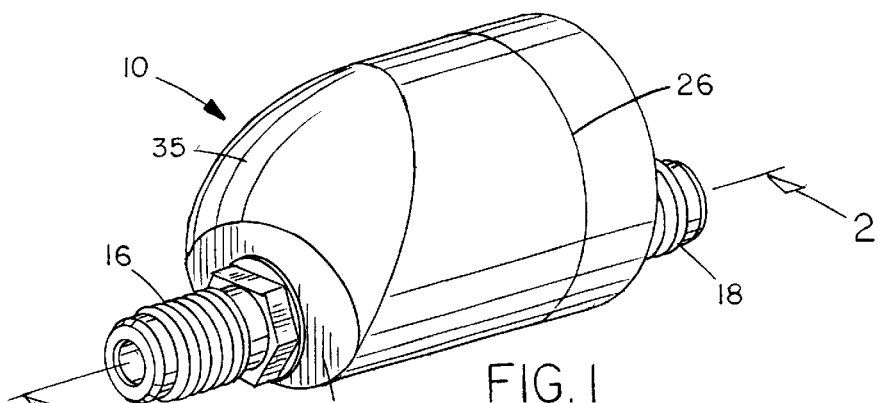
FIG. 1 is a perspective view of a purification apparatus according to an exemplary embodiment of the invention.
Figure 2:
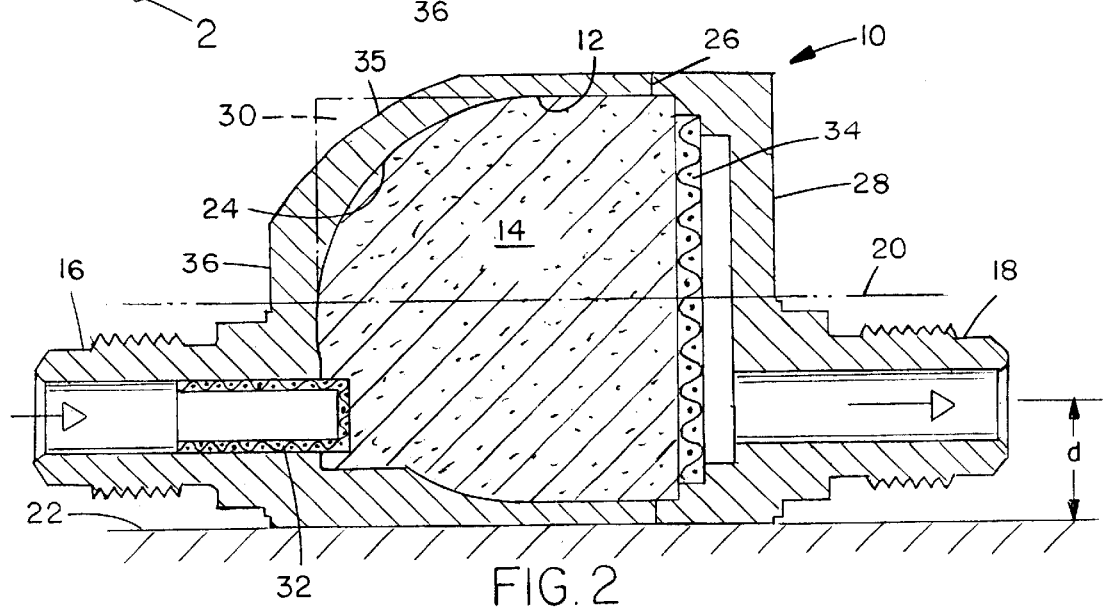
FIG. 2 is an enlarged sectional view taken on line 2—2 of FIG. 1.
Figure 3:
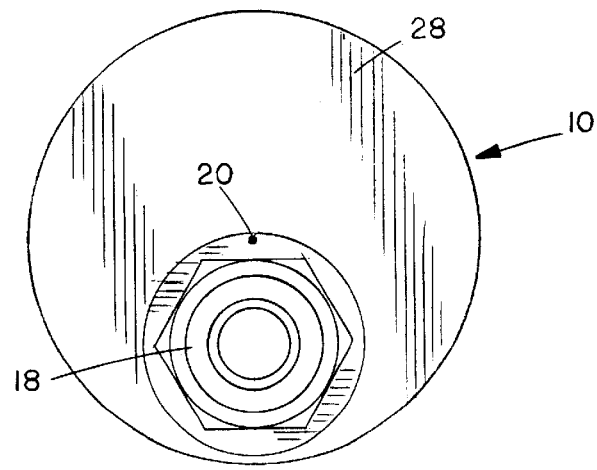
FIG. 3 is an enlarged end view of the outlet end of the purifier housing.

FIGS. 1 to 3 of the drawings illustrate a gas purification apparatus according to an exemplary embodiment of the present invention. The apparatus basically comprises a housing 10 having an internal purification chamber 12 substantially filled with a suitable gas purification medium 14. The housing has an inlet port 16 at one end for supply of gas to the chamber, and an outlet port 18 at the opposite end for exit of purified gas from the chamber, as indicated by the arrows in FIG. 2. The inlet and outlet ports are both offset from the central axis 20 of the housing in a lower portion of the housing, to permit the housing to be more readily mounted on a gas panel 22 as indicated in dotted line in FIG. 2. Such gas panel arrangements typically provide only a limited clearance between the panel surface and any gas purifier or filter inlets and outlets, and the offset inlet and outlet port of this invention permit the purifier to maintain a relatively large diameter while still placing the inlet and outlet ports at the desired distance from the gas panel itself.

The housing 10 is of any suitable metal such as stainless steel, nickel, or hastelloy. The chamber 12 is of generally cylindrical shape along part of its length extending from the outlet end towards the inlet end, and the inlet end has a curved, tapering portion 24 extending from inlet port 16 up to the cylindrical portion. Portion 24 may be a counterbore of part-spherical, spheroidal, or ellipsoidal shape formed in the inlet end of the chamber. In an exemplary embodiment, the housing 10 is formed in two parts, which are suitably welded or otherwise connected together in a fluid-tight manner along line 26, and the swept or tapering inlet portion 24 may be formed by turning on a lathe prior to connecting the two parts together. Thus, the outlet end of the chamber has a conventional flat end wall 28, while the inlet end of the chamber is rounded to avoid the sharp corner and resultant dead space 30 which would otherwise occur, as indicated in dotted outline in FIG. 2.

The distance or clearance d between the panel 22 or mounting surface and the inlet and outlet port axis is suitably in the range between 0.40 and 0.75 inches and may be of the order of 0.375 inches or 10 mm., which is a standard clearance provided in existing gas panel systems, while the housing diameter is of the order of 1.5 inches. The inlet and outlet ports are suitably offset from the central axis 20 of the housing by a distance of the order of around 0.37 inches or 10 mm, or approximately one quarter of the housing diameter. The length of the housing may be varied depending on the installation and capacity or purifier volume requirements, and may be in the range from around 2 inches to 5 inches. In one example the housing length was 3.31 inches long end to end. The radius of the part-spherical inlet portion of the purification chamber may be of the order of 0.5 to 0.8 inches, and in an exemplary embodiment the radius was approximately 0.69 inches. The radial or spherical surface is machined to be completely smooth and uniformly curved, so that gas will tend to flow along this surface and be swept into the entire volume of the purification medium. The chamber diameter will increase gradually from the inlet port up to a maximum at the cylindrical part of the chamber.

The curved or part-spherical inlet portion 24 extends along part of the length of the chamber from the inlet port. In the illustrated embodiment, portion 24 extends along less than half, or approximately one third of the length of the chamber, but the chamber length may be extended in other embodiments, and the length of the curved inlet portion will generally remain the same.

An inlet filter 32 is provided at the inner end of inlet port 16 for filtering particulates from the incoming gas. An outlet filter panel 34 extends across the chamber adjacent the outlet port 18 to retain the purification medium and remove any remaining, smaller size particulate material from the gas. The outer surface of the housing is also rounded to form a part-spherical, tapered portion 35 at the inlet end above inlet port 16, as indicated in FIGS. 1 and 2, providing a more compact, space-saving shape at the inlet end. A generally annular region 36 of the inlet end surrounding inlet port 16 is flat, and the housing then tapers in a smooth rounded shape up to the remainder of the outer surface of the housing, which is cylindrical. Alternatively, a secondary milling operation may be used to taper the annular region to eliminate potential deadlegs. The tapered portion 35 may have a radius of curvature larger than that of the inner, part-spherical portion 24, and in one embodiment the radius of portion 35 was in the range from 1.0 to 1.5 inches, with the radius in the specific embodiment referred to above being 1.19 inches. A secondary milling operation may also be used to provide a rounded surface surrounding the inlet 16 into the chamber 12.

The purification media may be of any suitable material for removing particulate and/or molecular impurities from the gas, and in an exemplary embodiment may be of a high surface area metal oxide substrate suitable for removal of gaseous contaminants to a purity level of the order of one ppb. Such a purification material or composition is described in co-pending Application Ser. No. 09/165,791 of Alvarez, Jr., filed Oct. 2, 1998, the contents of which are incorporated herein by reference. Other purification media may alternatively be used, dependent on the type of contaminants to be removed from the gas.

The offset purifier of this invention avoids the inefficiencies of previous, cylindrical and flat-ended offset purifier housings, and allows purifiers of larger diameter to be readily installed on existing gas panels without modifications. Companies thus have the option of replacing filters with purifiers providing improved gas purity, without having to replace or modify the entire gas panel. The swept or arcuate inlet portion of the purification chamber extends from the inlet port to ensure that gas will enter all portions of the purification medium, avoiding dead space at the corner as was encountered in offset purifiers with flat inlet end walls. The purifier chamber in this invention has a part-spherical counterbore at the inlet end surrounding the offset inlet port, so that there is no unused purification media and the media can be fully activated when regenerated, since regeneration gases will also be swept along the curved inlet surface and into the entire volume of purification medium.

Although an exemplary embodiment of the invention has been described above by way of example only, it will be understood by those skilled in the field that modifications may be made to the disclosed embodiment without departing from the scope of the invention, which is defined by the appended claims.

We claim:

1. A gas purification apparatus, comprising:

a housing having an internal purification chamber, an inlet end having an inlet port for gas supply to the chamber, and an opposite, outlet end having an outlet port for exit of purified gas from the chamber;

the housing being of generally cylindrical shape and having a central axis, an upper portion above said axis, and a lower portion below the axis;

the inlet and outlet ports being offset from the central axis and located in the lower portion of the housing;

a purification medium filling at least a major portion of the chamber; and the chamber having an internal wall which is cylindrical along part of the length of the housing extending from the outlet end, and which has a rounded, tapering inlet portion extending from the inlet port to the cylindrical part of the internal wall.

2. The apparatus as claimed in claim 1, wherein the tapering portion of the chamber comprises a part-spheroidal counter-bore at the inlet end of the chamber surrounding the inlet port.

3. The apparatus as claimed in claim 1, wherein the tapering portion of the chamber comprises a part-spherical counter-bore at the inlet end of the chamber surrounding the inlet port.

4. The apparatus as claimed in claim 1, wherein the tapering portion of the chamber comprises a part-ellipsoidal counter-bore at the inlet end of the chamber surrounding the inlet port.

5. The apparatus as claimed in claim 1, wherein the inlet and outlet ports are offset from the central axis by a distance equal to approximately one quarter of the housing diameter.

6. The apparatus as claimed in claim 1, wherein the rounded inlet portion of the chamber wall extends along less than half of the length of the chamber.

7. The apparatus as claimed in claim 6, wherein the rounded inlet portion extends along approximately one third of the length of the chamber.

8. The apparatus as claimed in claim 1, wherein the housing has an outer surface which is substantially cylindrical with a flat outlet end, and the inlet end has a flat, annular portion surrounding the inlet port and a rounded, part-spherical portion extending from the annular portion upwardly and forwardly to meet the cylindrical outer surface.

9. The apparatus as claimed in claim 8, wherein the part-spherical portion of the outer surface has a curvature different from that of the inner, rounded inlet portion.

10. The apparatus as claimed in claim 9, wherein the part-spherical portion of the outer surface has a radius in the range from 1.0 to 1.5 inches.

11. The apparatus as claimed in claim 1, wherein the inner, rounded inlet portion is a part-spherical shape having a radius in the range from 0.6 to 0.75 inches.

12. The apparatus as claimed in claim 1, wherein lower portion of the housing has a base for mounting adjacent a gas panel, and a spacing between the axis of the inlet and outlet port and the base of the outer cylindrical surface is in the range from 0.40" to 0.75".

13. The apparatus as claimed in claim 1, wherein the purification medium is of a material for removal of gas contaminants to purity levels below 10 ppm.

14. The apparatus as claimed in claim 13, wherein the purification medium removes gas contaminants to purify levels below 1 ppb.

15. The apparatus as claimed in claim 1, wherein the length of the housing from the inlet end to the outlet end is approximately 3.31".

16. A gas purification apparatus for removing impurities from gases, comprising:

a housing having a central axis, an inner wall defining an internal chamber, an inlet end, and an outlet end;

an inlet port at the inlet end of the housing for entry of gas into the chamber and an outlet port at the outlet end of the housing for exit of gas from the chamber;

the inlet and outlet ports being offset a predetermined distance to one side of the central axis of the housing;

a purification medium filling at least a major portion of the chamber extending from the inlet end towards the outlet end; and the inner wall of the housing having a curved, non-flat tapering portion extending from the inlet port towards the outlet end of the chamber, the curved, tapering portion comprising means for sweeping gases entering the chamber into all regions of the purification medium and avoiding any dead spaces, whereby the chamber has a portion of maximum diameter adjacent the outlet end and the tapering a portion is of varying diameter which increases from the inlet end up to the maximum diameter.

17. The apparatus as claimed in claim 16, wherein the curved, non-flat tapering portion comprises a symmetrical, part-spherical counter bore, and the maximum diameter portion of the chamber is cylindrical.

18. The apparatus as claimed in claim 16, wherein the curved, non-flat tapering portion comprises a symmetrical, part-spheroidal counter bore, and the maximum diameter portion of the chamber is cylindrical.

19. The apparatus as claimed in claim 16, wherein the curved, non-flat tapering portion comprises a symmetrical, part-ellipsoidal counter bore, and the maximum diameter portion of the chamber is cylindrical.

20. The apparatus as claimed in claim 16, wherein the housing is of a material selected from the group consisting of stainless steel, nickel, and hastelloy.

21. The apparatus as claimed in claim 16, wherein the purification medium is a material for removing gaseous contaminants to a purity level of less than 10 ppm.

22. The apparatus as claimed in claim 21, wherein the purification medium is a material for removing gaseous contaminants to a purity level of less than 1 ppb.

* * * * *